(12) United States Patent
Chen et al.

(10) Patent No.: US 7,153,804 B2
(45) Date of Patent: Dec. 26, 2006

(54) CATALYST COMPONENT FOR ETHYLENE POLYMERIZATION, THE PREPARATION THEREOF AND CATALYST COMPRISING THE SAME

(75) Inventors: Wei Chen, Beijing (CN); Zifang Guo, Beijing (CN); Junling Zhou, Beijing (CN); Hongxu Yang, Beijing (CN); Ruixia Li, Beijing (CN); Ruiping Wang, Beijing (CN); Yuexiang Liu, Beijing (CN); Hongtao Wang, Beijing (CN); Jingmei Zhang, Beijing (CN); Xiaojing Cheng, Beijing (CN)

(73) Assignees: China Petroleum & Chemical Corporation, Beijing (CN); Beijing Reasearch Institute of Chemical Industry, Beijing (CN)

( * ) Notice: Subject to any disclaimer, the term of this patent is extended or adjusted under 35 U.S.C. 154(b) by 38 days.

(21) Appl. No.: 11/104,976

(22) Filed: Apr. 12, 2005

(65) Prior Publication Data

US 2005/0227858 A1 Oct. 13, 2005

(30) Foreign Application Priority Data

Apr. 12, 2004 (CN) .................... 2004 1 0031128

(51) Int. Cl.
*B01J 31/00* (2006.01)
*C08F 4/44* (2006.01)

(52) U.S. Cl. ............... 502/115; 502/102; 502/103; 502/113; 502/118; 502/121; 502/126; 526/124.2; 526/124.3; 526/346

(58) Field of Classification Search ............ 502/103, 502/102, 113, 115, 118, 121, 125, 126; 526/124, 526/3, 346, 124.2, 124.3
See application file for complete search history.

(56) References Cited

U.S. PATENT DOCUMENTS 3,776,091 A * 12/1973 Suzuki ............... 84/403
4,784,983 A * 11/1988 Mao et al. ............ 502/111
5,288,933 A    2/1994 Kao et al.
6,107,231 A * 8/2000 Huffer et al. .......... 502/118
6,200,922 B1 * 3/2001 Huffer et al. .......... 502/120
6,221,984 B1 * 4/2001 Kersting et al. ...... 526/124.3
6,521,722 B1 * 2/2003 Bidell et al. .......... 526/88
6,524,995 B1 * 2/2003 Spaether et al. ....... 502/341
6,881,801 B1 * 4/2005 Dolle et al. ........... 526/136

FOREIGN PATENT DOCUMENTS

| CN | 1104220 | 6/1995 |
|---|---|---|
| CN | 1229092 | 9/1999 |
| EP | 0752431 | 1/1997 |
| EP | 860452 | 8/1998 |

OTHER PUBLICATIONS

PCT Search Report (Aug. 25, 2005).

* cited by examiner

*Primary Examiner*—Anthony J. Green
(74) *Attorney, Agent, or Firm*—Morgan & Finnegan, LLP

(57) ABSTRACT

The present invention provides a catalyst component for ethylene polymerization, a process for preparing the same, a catalyst comprising the same, and a process for polymerizing ethylene using the catalyst. The catalyst component comprises a reaction product, supported on an inorganic oxide support, of a magnesium complex, a titanium compound, an alcohol compound, and an organoaluminum compound, wherein said magnesium complex is formed by dissolving a magnesium halide in a solvent system comprising an organic epoxy compound and an organo phosphorus compound. The catalyst according to the invention is especially suitable for slurry phase polymerization of ethylene. The catalyst according to the present invention has high catalytic activity, and a good hydrogen response, with the resultant polymer having a more uniform particle size diameter and a narrow particle size distribution.

15 Claims, No Drawings

US 7,153,804 B2

CATALYST COMPONENT FOR ETHYLENE POLYMERIZATION, THE PREPARATION THEREOF AND CATALYST COMPRISING THE SAME

CROSS REFERENCE OF RELATED APPLICATION

The present application claims priority to Chinese Patent Application No. 2004100311280, filed on Apr. 12, 2004, which is incorporated herein by its entirety for all purposes.

FIELD OF THE INVENTION

The present invention relates to a catalyst component for ethylene polymerization, a process for preparing the same, a catalyst comprising the same, and a process for polymerizing ethylene using the catalyst.

BACKGROUND ART OF THE INVENTION

It is well known that in industrial scale production of polyethylene, Ti/Mg catalyst systems are in the forefront. Relevant research on the catalysts is focused on the catalytic activity, particle morphology, particle size distribution, hydrogen response, copolymerization performance, and the like. For slurry phase polymerization processes of ethylene, it is quite important that the catalysts used should have higher catalytic activity for controlling the particle size and particle size distribution of the resultant polyethylene polymer. During the polymerization of ethylene, in particular in slurry phase polymerization of ethylene, fine polymer particles readily form. Such fine polymer particles will likely cause the generation of static electricity, leading to the occurrence of "dust" phenomenon, and the formation of agglomerates which may block the transfer conduit systems during after-treatment. The most effective approach for controlling particle size and particle size distribution of the polymer is to control the particle size and particle size distribution of the catalyst used.

In the prior art, two methods are typically used to prepare the main catalyst components in order to obtain catalysts having uniform particle diameter and good particle morphology:

In the first method, powdery main catalyst components are obtained by dissolving a magnesium compound, such as magnesium dichloride, into a solvent to form a homogeneous solution, combining the solution with a titanium compound and optionally with an electron donor compound to precipitate a solid comprising magnesium, titanium, and the optional electron donor compound, followed by treating the solid with excess liquid titanium compound. The main catalyst components are then mixed with co-catalyst component to form catalyst systems. See, for example, the disclosures of CN1099041 A (U.S. Pat. No. 5,459,116), CN1229092 (U.S. Pat. No. 6,617,278B1), CN85100997 (U.S. Pat. No. 4,784,983). There are several drawbacks to such conventional methods. The particle size and the particle size distribution of the catalysts are controlled completely by the precipitation process leading to a preparation with poor stability. There are also serious problems with the recovery system and the environment. In addition, the cost of the catalysts is rather high due to the need to use a large amount of a liquid titanium compound. Moreover, at times, the hydrogen response and catalytic activity of the catalyst systems are unsatisfactory in that it is difficult to control the particle size, resulting polymer powder with a relatively broad particle size distribution.

In the second method, the active component of the catalyst is directly supported on an inert support, such as silica. Since the diameter of the particle size of the silica support is easily controlled with good particle morphology, catalyst particles having uniform particle size can be obtained. However, the loading of the active component on the support is limited, therefore, the titanium content in the catalyst systems obtained by such a method is relatively low with low catalytic activity for polymerization. For instance, CN1268520 discloses a catalyst that is prepared using magnesium dichloride with silica as the support and titanium tetrachloride as the active component. $MgCl_2$ in tetrahydrofuran (THF) is reacted with TiCl4. The reaction product is then combined with a silica treated with aluminum alkyls. The THF is then removed to give a main catalyst component. When the catalyst is used in the polymerization of ethylene, a low level of polymerization was obtained because of the lower titanium content in the catalyst. Although such catalyst systems can be used in gas phase fluidized bed polymerization of ethylene, it is undesirable for use in slurry phase polymerization of ethylene because of the low level of polymerization obtained.

For slurry phase polymerization of ethylene, the catalysts are required to exhibit a high level of catalytic activity, good particle size distribution, and good hydrogen response. Good hydrogen response is indicated when the melt index of the polymer obtained is easily adjusted by varying the partial pressure of hydrogen in the polymerization process to obtain various grades of polyethylene resins. The catalyst systems described provide unsatisfactory levels of hydrogen response.

Therefore, it is desirable to provide a catalyst which exhibits high catalytic activity, with narrow particle size distribution, and provide a good hydrogen response that is suitable for slurry phase polymerization process of ethylene.

SUMMARY OF THE INVENTION

One object of the invention is to provide a catalyst component for ethylene polymerization, comprising a reaction product, on an inorganic oxide support, of a magnesium complex with a titanium compound, an alcohol compound, and an organoaluminum compound, wherein said magnesium complex is formed by dissolving a magnesium halide in a solvent system comprising an organic epoxy compound and an organo phosphorus compound, said alcohol being a linear, branched, or cyclic alkanol wherein the alky group has 1 to 10 carbon atoms, said organoaluminum compound is represented by $AlR^1{}_nX^1{}_{3-n}$, in which $R^1$ is independently hydrogen, alkyl, aryl or aralkyl with 1 to 20 carbon atoms, $X^1$ is halogen, and $0<n\leq3$, said titanium compound is represented by $Ti(OR^2)_aX^2{}_b$, in which $R^2$ is independently alkyl or aryl having from 1 to 14 carbon atoms, $X^2$ is halogen, a is an integer 0 to 4, b is an integer 1 to 4, and a+b=3 or 4.

Another object of the invention is to provide a process for the preparation of the catalyst component according to the present invention, comprising the steps of:

i. dissolving a magnesium halide in a solvent system comprising an organic epoxy compound and an organo phosphorus compound to form a homogenous solution; adding an alcohol compound during or after the formation of the solution; adding an organoaluminum compound after the formation of the solution, wherein the alcohol compound and the organoaluminum compound can be added simultaneously or separately; and ii. contacting and reacting the solution obtained in step (i) with a titanium compound in the presence of an inorganic oxide support, which is added before or after the contacting of the solution with the titanium compound, at a lower temperature; and then slowly enhancing the temperature to 60° C. to 100° C., so that a solid gradually precipitates on the support, to provide a catalyst component according to the present invention.

Yet another object of the invention is to provide a catalyst for ethylene polymerization, comprising a reaction product of:

i. a solid catalyst component according to the present invention; and ii. at least one organoaluminium compound of formula $AlR^3_n X^3_{3-n}$, in which $R^3$ is independently hydrogen, alkyl, aryl or aralkyl of from 1 to 20 carbon atoms, $X^3$ is halogen, and $0 < n \leq 3$.

Yet still another object of the invention is to provide a process for ethylene polymerization, comprising the step of contacting ethylene and optional C3–C20 α-olefin(s) or vinyl aromatic monomer(s) with the catalyst according to the present invention under polymerization conditions.

DETAILED DESCRIPTION OF THE INVENTION

The present invention provides a catalyst component for ethylene polymerization, comprising a reaction product, supported on an inorganic oxide support, of a magnesium complex with a titanium compound, an alcohol compound, and an organoaluminum compound, wherein said magnesium complex is formed by dissolving a magnesium halide in a solvent system comprising an organic epoxy compound and an organo phosphorus compound, said alcohol compound is a linear, branched, or cyclic alkanol with 1 to 10 carbon atoms, said organoaluminum compound is represented by $AlR^1_n X^1_{3-n}$, in which $R^1$ is independently hydrogen, alkyl, aryl or aralkyl having from 1 to 20 carbon atoms, $X^1$ is halogen, and $0 < n \leq 3$, said titanium compound is represented by $Ti(OR^2)_a X^2_b$, in which $R^2$ is independently alkyl or aryl having from 1 to 14 carbon atoms, $X^2$ is halogen, a is an integer 0 to 4, b is an integer 1 to 4, and a+b=3 or 4.

The term "polymerization" as used herein intends to include homopolymerization and copolymerization. The term "polymer" as used herein intends to include homopolymer, copolymer and terpolymer.

The term "catalyst component" as used herein intends to mean main catalyst component or pre-catalyst, which, together with co-catalyst components, forms a catalyst system for ethylene polymerization.

All inorganic oxides commonly used as catalyst support in the art are suitable for the catalyst component for ethylene polymerization according to the invention, silica, alumina, titania, chromia, zirconia, and mixtures thereof are preferred, with silica, alumia, and mixture thereof being most preferred. Generally, the silica for catalyst support is spherical, with an average particle diameter of from 1 to 50 microns, preferably from 5 to 30 microns. The silica support has typically a specific surface area larger than 200 m²/g, preferably larger than 250 m²/g, and preferably has an average porosity of from 1.4 to 1.8 ml/g. The support material should be dried, i.e. it contains no adsorbed water. It is preferred to activate the support at a temperature no less than 600° C. prior to use. Alternatively or optionally, the support can be activating by treatment with aluminum alkyls.

The magnesium complex referred to in the application is one formed by dissolving a magnesium halide in a solvent system comprising an organic epoxy compound and an organo phosphorus compound. Generally, such a complex is a homogeneous clear solution.

The magnesium halide is selected from the group consisting of magnesium dihalides, water or alcohol complexes of magnesium dihalides, and derivatives of magnesium dihalides wherein one or two halogen atoms are replaced by alkyll groups or halogenated alkoxy groups. Specific examples include magnesium dichloride, magnesium dibromide, phenoxy magnesium chloride, isopropoxy magnesium chloride, butoxy magnesium chloride, and the like, with magnesium dichloride being preferred. These magnesium halide compounds may be used alone or in combination.

The organic epoxy compound in the solvent system is selected from the group consisting of aliphatic epoxy compounds and diepoxy compounds, halogenated aliphatic epoxy compounds and diepoxy compounds, glycidyl ether, and inner ethers, having from 2 to 8 carbon atoms. Examples include, but are not limited to, epoxy ethane, epoxy propane, epoxy butane, vinyl epoxy ethane, butadiene dioxide, epoxy chloropropane, glycidyl methyl ether, and diglycidyl ether.

The organo phosphorus compound in the solvent system is an alkyl ester or halogenated alkyl esters of orthophosphoric acid or phosphorous acid. Examples include trimethyl orthophosphate, triethyl orthophosphate, tributyl orthophosphate, triphenyl orthophosphate, trimethyl phosphite, triethyl phosphite, tributyl phosphite and tribenzyl phosphite.

Based on per mole of magnesium halide, the amount of organic epoxy compound used is in a range of from 0.2 to 10 moles, preferably from 0.5 to 4 moles; and the amount of organo phosphorus compound used is in a range of from 0.1 to 10 moles, preferably from 0.2 to 4 moles.

To more sufficiently dissolve the magnesium halide, an inert diluent is optionally added to the solvent system. The inert diluent is typically an aromatic or aliphatic hydrocarbon, as long as it facilitates the dissolution of the magnesium halide. Examples of aromatic hydrocarbons include benzene, toluene, xylene, chlorobenzene, dichlorobenzene, trichlorobenzene, chlorotoluene, and derivatives thereof, and examples of aliphatic hydrocarbons include linear, branched, or cyclic alkanes having from 3 to 20 carbon atoms, such as butane, pentane, hexane, cyclohexane, heptane, and the like. These inert diluents may be used alone or in combination. The amount of the inert diluent, if used, is not critical. Generally, it is in a range of from 0.2 to 10 liters per mole of magnesium halide.

The useful alcohol compounds include those having a linear, branched, or cyclic alkyl moiety with from 1 to 10 carbon atoms. Examples include methanol, ethanol, propanol, isopropanol, butanol, isobutanol, glycerol, hexanol, 2-methylpentanol, 2-ethylbutanol, heptanol, 2-ethylhexanol, octanol, decanol, cyclohexanol, and methyl cyclohexanol, with ethanol, butanol, 2-ethylhexanol, and glycerol being preferred.

The organoaluminum compound is represented by $AlR^1_n X^1_{3-n}$, wherein $R^1$ is independently hydrogen or hydrocarbyl, in particular alkyl, aralkyl or aryl, having from 1 to 20 carbon atoms, $X^1$ is halogen, in particular chlorine or bromine, and $0<n\leq 3$. It is preferred that n is not 3. Examples of an organoaluminum compound include trimethyl aluminum, triethyl aluminum, triisobutyl aluminum, trioctyl aluminum, diethyl aluminum hydride, diisobutyl aluminum hydride; alkyl aluminum halides such as diethyl aluminum chloride, diisobutyl aluminum chloride, sesquiethyl aluminum chloride, and ethyl aluminum dichloride. Alkyl aluminum halides are preferred, and diethyl aluminum chloride is the most preferred.

The titanium compound is represented by $Ti(OR^2)_aX^2_b$, in which $R^2$ is independently aliphatic hydrocarbyl or aromatic hydrocarbyl having from 1 to 14 carbon atoms, $X^2$ is halogen, a is an integer from 0 to 4, b is an integer from 1 to 4, and a+b=3 or 4. The preferred is titanium tetrachloride, titanium tetrabromide, titanium tetraiodide, tetrabutoxy titanium, tetraethoxy titanium, triethoxy titanium chloride, titanium trichloride, diethoxy titanium dichloride, ethoxy titanium trichloride and mixtures thereof.

In the catalyst component according to the present invention, titanium content is typically in a range of from 1.0 to 8.0 percent by weight, magnesium content is typically in a range of from 5.0 to 20 percent by weight, and chlorine content is typically in a range of from 20 to 70 percent by weight, based on the weight of the catalyst component.

The catalyst component according to the present invention can be prepared by a process comprising the steps of:
  i. dissolving at a temperature in the range of 50 to 90° C. a magnesium halide in a solvent system comprising an organic epoxy compound and an organo phosphorus compound, into which an inert diluent is preferably added, to form a homogenous solution; adding an alcohol compound during or after the formation of the solution; adding an organoaluminum compound after the formation of the solution, wherein the alcohol compound and the organoaluminum compound can be added simultaneously or separately, but it is preferred to add the alcohol compound prior to the addition of the organoaluminum compound; and allowing the mixture to react for a period of time; and
  ii. contacting and reacting the solution obtained in step (i) with a titanium compound in the presence of an inorganic oxide support, which is added before or after the contacting of the solution with the titanium compound, at a lower temperature, preferably from −40° C. to 20° C.; and then slowly increasing the temperature to 60° C. to 100° C., so that a solid gradually precipitates on the support; after allowing the reaction to continue for a period of time, removing unreacted reactant and solvent, and washing the residua with inert diluent, to give the catalyst component according to the present invention.

In the process for preparing the catalyst component for ethylene polymerization according to the present invention, amount of the alcohol compound used is from 0.1 to 10 moles, preferably from 1 to 4 moles; amount of the organoaluminum compound used is from 0.05 to 5 moles, preferably from 0.1 to 0.5 moles; amount of the titanium compound used is from 1 to 15 moles, preferably from 2 to 10 moles, and amount of the inorganic oxide support used is from 10 to 200 grams, preferably from 30 to 80 grams, with respect to one mole of the magnesium halide.

The present invention further provides a catalyst for homopolymerization of ethylene or copolymerization of ethylene and C3–C20 α-olefin(s) or vinyl aromatic monomer(s). The C3–C20 α-olefins include propylene, butene-1, 4-methyl-pentene-1, hexene-1, and octene-1, and vinyl aromatic monomers include styrene, methyl styrene, and the like. The catalyst comprises a reaction product of:
  i. the catalyst component according to the present invention as described above; and
  ii. at least one organoaluminium compound of formula $AlR^3_nX^3_{3-n}$, wherein $R^3$ is independently hydrogen or hydrocarbyl, in particular alkyl, aralkyl or aryl, having from 1 to 20 carbon atoms, $X^3$ is halogen, in particular chlorine or bromine, and $0<n\leq 3$. Examples of the organoaluminium compound include trimethyl aluminum, triethyl aluminum, triisobutyl aluminum, tri-n-butyl aluminum, tri-n-hexyl aluminum, trioctyl aluminum, diethyl aluminum hydride, diisobutyl aluminum hydride; alkyl aluminum halides such as diethyl aluminum chloride, diisobutyl aluminum chloride, sesquiethyl aluminum chloride, and ethyl aluminum dichloride. The preferred is a trialkyl aluminum compound, and the most preferred are triethyl aluminum and triisobutyl aluminum. The molar ratio of the aluminum in the above component (b) to the titanium in the above component (a) is in a range of from 5 to 500, and preferably from 20 to 200.

Another aspect of the invention relates to a process for ethylene polymerization, comprising the step of contacting ethylene and optional C3–C20 α-olefin(s) or vinyl aromatic monomer(s) with the catalyst according to the present invention under polymerization conditions.

The polymerization can be carried out in slurry phase or gas phase.

Liquid polymerization media useful in the polymerization process of the invention include inert solvents, such as saturated aliphatic hydrocarbons and aromatic hydrocarbons, for example, hexane, heptane, cyclohexane, naphtha, raffinate oil, hydrogenated gasoline, kerosene, benzene, toluene, xylene, and the like. Pre-polymerization can be carried out before the polymerization, and the polymerization can be performed batchwise, semi-batchwise, or continuously.

The polymerization process is carried out at a temperature of from 0° C. to 150° C., preferably from 40° C. to 100° C.

Hydrogen gas is used as a molecular weight regulator in order to adjust the molecular weight of the final polymer.

EMBODIMENTS FOR CARRYING OUT THE INVENTION

The following examples further illustrate the invention, but are not to be used to limit the invention.

EXAMPLE 1

(1) The Preparation of the Catalyst Component

To a reactor, in which the atmosphere had been completely replaced with highly pure $N_2$, were added successively 4.0 g of magnesium dichloride, 100 ml of toluene treated with molecular sieve, 3.0 ml of epoxy chloropropane, 2.8 ml of tributyl phosphate, and 6.4 ml of ethanol. The mixture was heated to 80° C. with stirring. After the solid was completely dissolved to form a homogeneous solution, the solution was heated at 80° C. for a further 30 minutes. The solution was cooled to 30° C., then 4.8 ml of 2.2 M solution of diethyl aluminum chloride in hexane were added thereto, and the mixture was allowed to react at 30° C. for one hour. Then 2.5 g of heat dried silica (available from GRACE Corp., 2212 grade, dried at 600° C. for 4 hours before it was used) was added to the solution, and after the reaction mixture was cooled to −25° C., 40 ml of $TiCl_4$ were added dropwise thereto. The temperature was then raised slowly to 80° C., and the reaction was continued at that temperature for further 2 hours. The stirring was stopped, and the supernatant liquid was quickly removed, and the residue was washed twice with toluene and four times with hexane, then blown dry with highly pure $N_2$, to give a solid catalyst component having good flowability and a narrow particle size distribution. The catalyst component was found to have a titanium content of 6.21 percent by weight, a magnesium content of 10.38 percent by weight, a chlorine content of 43.52 percent by weight, an ethoxy content of 4.7 percent by weight, an aluminum content of 0.19 percent by weight, a silicone content of 4.85 percent by weight, and an phosphorus content of 4.75 percent by weight.

(2) Polymerization of Ethylene

To a 2 liters stainless steel autoclave, in which the atmosphere had been well replaced with highly pure $N_2$, were added 1 liter of hexane, 1.0 ml of 1 mmol/ml solution of $AlEt_3$ in hexane, and an amount of the above-prepared solid catalyst component containing 0.25 milligrams of titanium. The reactor was heated to 75° C., hydrogen gas was then introduced until the pressure in the reactor reached 0.28 MPa (gauge pressure). Ethylene was then introduced until the total pressure in the autoclave reached 0.73 MPa (gauge pressure). The polymerization reaction was continued at 80° C. for 2 hours. The results are shown in Table 1 and Table 2.

EXAMPLE 2

(1) The catalyst component was prepared according to the same procedure as described in Example 1, except for that the amount of ethanol used was changed from 6.4 ml to 5.9 ml.

(2) Ethylene polymerization was carried out according to the same procedure as described in Example 1, and the results are shown in Table 1.

EXAMPLE 3

(1) The catalyst component was prepared according to the same procedure as described in Example 2, except for that the amount of the solution of diethyl aluminum chloride used was changed from 4.8 ml to 4.4 ml.

(2) Ethylene polymerization was carried out according to the same procedure as described in Example 1, and the results are shown in Table 1.

EXAMPLE 4

(1) The catalyst component was prepared according to the same procedure as described in Example 2, except for that the amount of the solution of diethyl aluminum chloride used was changed to 3.8 ml.

(2) Ethylene polymerization was carried out according to the same procedure as described in Example 1, and the results are shown in Table 1.

EXAMPLE 5

(1) The catalyst component was prepared according to the same procedure as described in Example 1, except for that the solution of diethyl aluminum chloride used was replaced by 4.6 ml of 1.0 M solution of triethyl aluminum in hexane.

(2) Ethylene polymerization was carried out according to the same procedure as described in Example 1, and the results are shown in Table 1.

EXAMPLE 6

(1) The catalyst component was prepared according to the same procedure as described in Example 1, except for that the amount of ethanol used was changed to 9.8 ml.

(2) Ethylene polymerization was carried out according to the same procedure as described in Example 1, and the results are shown in Table 1.

EXAMPLE 7

(1) The catalyst component was prepared according to the same procedure as described in Example 1.

(2) Ethylene polymerization was carried out according to the same procedure as described in Example 1, except for that ratio of hydrogen partial pressure to ethylene partial pressure was changed to 0.18 MPa/0.55 MPa, and the results are shown in Table 2.

EXAMPLE 8

(1) The catalyst component was prepared according to the same procedure as described in Example 1.

(2) Ethylene polymerization was carried out according to the same procedure as described in Example 1, except for that the ratio of hydrogen partial pressure to ethylene partial pressure was changed to 0.38 MPa/0.35 MPa, and the results are shown in Table 2.

EXAMPLE 9

(1) The catalyst component was prepared according to the same procedure as described in Example 1.

(2) Ethylene polymerization was carried out according to the same procedure as described in Example 1, except for that the ratio of hydrogen partial pressure to ethylene partial pressure was changed to 0.45 MPa/0.28 MPa, and the results are shown in Table 2.

EXAMPLE 10

(1) The catalyst component was prepared according to the same procedure as described in Example 1.

(2) Ethylene polymerization was carried out according to the same procedure as described in Example 1, except for that the ratio of hydrogen partial pressure to ethylene partial pressure was changed to 0.58 MPa/0.15 MPa, and the results are shown in Table 2.

COMPARATIVE EXAMPLE 1

(1) The catalyst component was prepared according to the same procedure as described in Example 1, except that no diethyl aluminum chloride solution was used.

(2) Ethylene polymerization was carried out according to the same procedure as described in Example 1, and the results are shown in Table 1.

COMPARATIVE EXAMPLE 2

(1) The catalyst component was prepared according to the procedure as described in Example 1 of CN 1229092 as follows:

To a reactor, in which the atmosphere had been completely replaced with highly pure $N_2$, were added successively 0.042 mol (about 4.0 g) of anhydrous magnesium dichloride, 60 ml of toluene, 0.032 mol of epoxy chloropropane, 0.022 mol of tributyl phosphate, and 0.017 mol of ethanol. The mixture was heated with stirring to 80° C. and held at that temperature for a further 15 minutes to completely dissolve the solid, to give a homogeneous solution. Then 0.0074 moles of phthalic anhydride were added thereto, and the solution was held at that temperature for further one hour. The solution was cooled to −25° C., and 0.5 moles (about 55 ml) of $TiCl_4$ were added dropwise thereto. Then the temperature was raised slowly to 80° C., and the reaction was continued at that temperature for a further 3 hours. After filtering, the filter cake was washed with three times with toluene and three times with hexane, then dried under vacuum to give a solid catalyst component.

(2) Ethylene polymerization was carried out according to the same procedure as described in Example 1, and the results are shown in Table 1.

It can be seen from the results shown in Table 1 and Table 2 that using the catalyst according to the present invention, polyethylene resin having a higher melt index is obtained under the same polymerization conditions, and resins having different melt index can be easily obtained vy varying the hydrogen partial pressure in the polymerization process, i.e., melt index will more markedly vary as hydrogen partial pressure varies. In addition, due to the incorporation of inorganic oxide support in the catalyst of the invention, the particle size distribution of the resultant polymer is narrower than that obtained in Comparative Example 2 (where phthalic anhydride was used as the precipitating agent), with less of both the large particles and fine powders in the resultant polymer.

TABLE 1

| No. | $C_2H_5OH$ ml | $Et_2AlCl$ ml | $Et_3Al$ ml | Silica g | Activity gPE/gc at | BD g/cm³ | $MI_{2.16}$ g/10 min | Particle Size Distribution (mesh) | | | | | | | |
|---|---|---|---|---|---|---|---|---|---|---|---|---|---|---|---|
| | | | | | | | | <20 | 20–40 | 40–60 | 60–80 | 80–100 | 100–140 | 140–200 | >200 |
| Ex. 1 | 6.4 | 4.8 | | 2.5 | 40020 | 0.31 | 0.34 | 3.7 | 17.4 | 54.1 | 13.9 | 5.0 | 3.5 | 1.6 | 0.7 |
| Ex. 2 | 5.9 | 4.8 | | 2.5 | 37113 | 0.32 | 0.28 | 5.9 | 70.0 | 11.8 | 4.9 | 3.3 | 2.4 | 1.3 | 0.6 |
| Ex. 3 | 5.9 | 4.4 | | 2.5 | 42373 | 0.31 | 0.24 | 9.7 | 16.9 | 27.8 | 28.9 | 9.3 | 5.9 | 1.1 | 0.7 |
| Ex. 4 | 5.9 | 3.8 | | 2.5 | 41071 | 0.33 | | 2.2 | 25.3 | 59.3 | 9.1 | 1.8 | 1.2 | 0.9 | 0.3 |
| Ex. 5 | 6.4 | | 4.6 | 2.5 | 20300 | 0.32 | 0.22 | 0.45 | 15.0 | 69.7 | 6.9 | 2.4 | 2.2 | 2.2 | 1.22 |
| Ex. 6 | 9.8 | 6.4 | | 2.5 | 25800 | 0.33 | | | | | | | | | |
| Comp. Ex. 1 | 6.4 | | | 2.5 | 34640 | 0.32 | 0.18 | | | | | | | | |
| Comp. Ex. 2 | | | | 0 | 21100 | 0.31 | 0.19 | 12.3 | 22.5 | 25.2 | 16.9 | 12.1 | 8.4 | 5.7 | 1.9 |

TABLE 2

| No. | $H_2/C^-_2$ MPa/MPa | Activity gPE/gcat | $MI_{2.16}$ g/10 min |
|---|---|---|---|
| Ex. 1 | 0.28/0.45 | 40020 | 0.34 |
| Ex. 7 | 0.18/0.55 | 51680 | 0.05 |
| Ex. 8 | 0.38/0.35 | 23330 | 0.85 |
| Ex. 9 | 0.45/0.28 | 15810 | 2.69 |
| Ex. 10 | 0.58/0.15 | 6860 | 25.05 |

What is claimed is:

1. A catalyst component for ethylene polymerization, comprising a reaction product supported on an inorganic oxide support, said reaction product being prepared from
   a. a magnesium complex formed by dissolving a magnesium halide in a solvent system comprising:
      i. an organic epoxy compound selected from the group consisting of an alkyl epoxy, an alkyl diepoxy, a halogenated alkyl epoxy or alkyl diepoxy and glycidyl ether, wherein said alkyl is a C2 to C8 alkyl and
      ii. an organophosphorus compound selected from the group consisting of alkyl or halogenated alkyl esters of orthophosphoric acid or phophorous acid;
   b. an alcohol selected from the group consisting of a linear, branched, or cyclic alkanol with from 1 to 10 carbon atoms;
   c. an organoaluminum compound, $AlR^1{}_nX^1{}_{3-n}$, in which $R^1$ is independently hydrogen, alkyl, aryl or aralkyl having from 1 to 20 carbon atoms, $X^1$ is halogen, and $0<n\leq3$: and
   d. a titanium compound is represented by $Ti(OR^2)_aX^2{}_b$, in which $R^2$ is independently alkyl or aryl having from 1 to 14 carbon atoms, $X^2$ is halogen, a is an integer from 0 to 4, b is an integer from 1 to 4, and a+b =3 or 4; and said reaction product being supported on an inorganic oxide selected from the group consisting of silica, alumina, titanium oxide, chromium oxide, zirconia and mixtures thereof.

2. The catalyst component for ethylene polymerization according to claim 1, wherein in the preparation of the magnesium complex, the amount of said organic epoxy compound used is in a range of from 0.2 to 10 moles, and the amount of organophosphorus compound used is in a range of from 0.1 to 10 moles, each with respect to one mole of magnesium halide.

3. The catalyst component for ethylene polymerization according to claim 1, wherein the inorganic oxide support is silica.

4. The catalyst component for ethylene polymerization according to claim 1, wherein the titanium content is in a range of from 1.0 to 8.0 percent by weight, the magnesium content is in a range of from 5.0 to 20 percent by weight, and the chlorine content is in a range of from 20 to 70 percent by weight, based on the weight of the catalyst component.

5. A process for the preparation of the catalyst component according to claim 1, comprising the steps of:
   (i) dissolving a magnesium halide in a solvent system comprising an organic epoxy compound selected from the group consisting of an alkyl epoxy, an alkyl diepoxy, a halogenated alkyl epoxy or alkyl diepoxy and glycidyl ether, wherein said alkyl is a 2 to 8 alkyl and an organophosphorus compound selected from the group consisting of alkyl or halogenated alkyl esters of orthophosphoric acid or phophorous acid, to form a homogenous solution;

(ii) adding an alcohol selected from the group consisting of a linear, branched, or cyclic alkanol with from 1 to 10 carbon atoms during or after the formation of the solution;

(iii) simultaneously or separately with the alcohol adding an organoaluminum compound, $AlR^1{}_nX^1{}_{3-n}$, in which $R^1$ is independently hydrogen, alkyl, aryl or aralkyl having from 1 to 20 carbon atoms, $X^1$ is halogen, and $0 < n \leq 3$ after the formation of the solution; and (iv) contacting and reacting the solution obtained in step (i) with a titanium compound $Ti(OR^2)_aX^2{}_b$, in which $R^2$ is independently alkyl or aryl having from 1 to 14 carbon atoms, $X^2$ is halogen, a is an integer from 0 to 4, b is an integer from 1 to 4, and $a+b = 3$ or 4, in the presence of an inorganic oxide support selected from the group consisting of silica, alumina, titanium oxide, chromium oxide, zirconia and mixtures thereof, said inorganic oxide support being added before or after the contacting of the solution and with the titanium compound, at a lower temperature in the range of $-40°$ C. to $20°$ C.; and then slowly enhancing the temperature to $60°$ C. to $100°$ C., so that a solid gradually precipitates on the inorganic oxide support, to yield the catalyst component.

6. The process according to claim 5, wherein the amount of the alcohol used is from 0.1 to 10 moles; the amount of the organoaluminum compound used is from 0.05 to 5 moles; and amount of the titanium compound used is from 1 to 15 moles, with respect to one mole of the magnesium halide.

7. The process according to claim 5, wherein amount of the inorganic oxide support used is from 10 to 200 grams, with respect to one mole of the magnesium halide.

8. The process according to claim 5, wherein the solvent system further comprises an inert diluent selected from the group consisting of aliphatic and aromatic hydrocarbons.

9. The process according to claim 5, wherein in the step (i), the alcohol is added prior to the addition of the organoaluminum compound.

10. A catalyst system for ethylene polymerization comprising:
   i. the catalyst component according to claim 1; and
   ii. at least one organoaluminum compound, $AlR^3{}_nX^3{}_{3-n}$, in which $R^3$ is independently a hydrogen or a hydrocarbyl having from 1 to 20 carbon atoms, $X3^1$ is halogen, and $0 < n \leq 3$.

11. The catalyst for ethylene polymerization according to claim 10, wherein the organoaluminium compound (b) is a trialkyl aluminum compound.

12. The catalyst for ethylene polymerization according to claim 11, wherein the trialkyl aluminum compound is selected from the group consisting of triethyl aluminum, triisobutyl aluminum, tri-n-butyl aluminum, tri-n-hexyl aluminum, and trioctyl aluminum.

13. A process for ethylene polymerization, comprising the step of contacting ethylene and optional C3–C20 α-olefin(s) or vinyl aromatic monomer(s) with the catalyst according to claim 10 under polymerization conditions.

14. The process for ethylene polymerization according to claim 13, wherein the process is slurry phase polymerization.

15. The process according to claim 10, wherein the inert diluent is selected from the group consisting of benzene, toluene, xylene, chlorobenzene, dichlorobenzene, trichlorobenzene, chlorotoluene, and derivatives thereof.

* * * * *